United States Patent Office 2,977,230
Patented Mar. 28, 1961

2,977,230

COMPOSITION AND PROCESS FOR CONTROLLING THE GROWTH RATE OF LIVE-STOCK AND POULTRY

Bernard J. Brent, Montclair, N.J., assignor to The Denver Chemical Manufacturing Company, Stamford, Conn., a corporation of Colorado No Drawing. Filed Oct. 28, 1958, Ser. No. 770,002

3 Claims. (Cl. 99—2)

The present invention relates to a method for controlling the fattening rate of livestock and poultry, and more particularly, to a method of increasing the weight and improving the meat quality of livestock and poultry, and to compositions and feed rations to be used in said method.

It is known that the goitrogenic agents thiourea and thiouracil compounds have a certain growth-stimulating effect upon livestock and poultry. However, said compounds have the disadvantage that they are not palatable to the animals. It was found that very frequently animals refuse to take feed containing such thiouracil compounds or thiourea.

Furthermore, thiouracil compounds, such as 2-thiouracil, 4-methyl-2-thiouracil and 4-propyl-2-thiouracil when administered in an effective dose, at the same time have an appetite depressing effect, thus, decreasing feed consumption and the rate of live-weight gain.

Another group of compounds which have a good fattening effect upon livestock and poultry, are estrogenic compounds and especially diethyl stilbestrol, which is quite extensively used in poultry and cattle. The estrogenic compounds, however, are physiologically highly active agents. They may cause excessive sexual stimulation (nymphomania). The doses have to be carefully controlled as higher doses produce residues in the edible meat and milk which residues would be harmful to the consumer.

Still another group of growth-promoting compounds are certain antibiotics of which chloro tetracycline sold under the trademark "Aureomycin" has proved to be especially effective. Antibiotic treatment, however, has proved of advantage only in younger animals, but was unsuccessful in the treatment of more mature animals.

It is one object of the present invention to provide a new and highly effective weight increasing and meat quality improving agent which is very palatable and well tolerated when fed to animals and especially to livestock.

Another object of the present invention is to provide a new feed supplement containing said new and highly effective weight increasing and meat quality improving agent which feed supplement can readily be fed or admixed to the animal feed.

A further object of the present invention is to provide a process of increasing the weight and improving the meat quality of livestock and poultry by feeding such a highly effective agent and feed supplement to said animals.

Still another object of this invention is to provide feed compositions which are readily taken by the animals and which have a pronounced fattening and meat quality improving effect without showing undue toxic manifestations.

Other objects of the present invention and advantageous features thereof will become apparent as the description proceeds.

In principle, the present invention has for its purpose to increase the live weight and to improve the meat quality of meat producing animals as well as to effect better feed utilization, by feeding to such animals 2-mercapto imidazole compounds of the following Formula I:

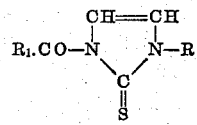

wherein:

R is an alkyl, aryl, or aralkyl radical, while
$R_1$ is an alkoxy, amido alkyl, aralkoxy, or aryloxy group.

An especially suitable compound of this type is the 1-methyl-2-mercapto-3-carbethoxy imidazole of the following Formula II:

II
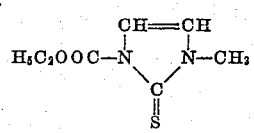

This compound, when administered to animals, has proved of great value. Its administration does not have an appetite-depressing effect as observed when feeding thiouracil compounds. On the contrary, 1-methyl-2-mercapto-3-carbethoxy imidazole and the like compounds of the above given Formula I have an appetite increasing effect and are very palatable. Animals treated with said compounds utilize the feed much better than controls. The better utilization of the feed calculated for the gain achieved by this treatment is quite considerable. In addition, the gain in weight observed on oral administration of said compounds and especially of 1-methyl-2-mercapto-3-carbethoxy imidazole exceeds by between about 10% and about 20% the gain in weight observed in control animals.

The new compounds have the great advantage over similar compounds which do not carry a carbalkoxy and the like substituent in 3-position that they are highly non-toxic.

Another advantage consists in their synergistic effect when fed together with diethyl stilbestrol or other estrogens. While, for instance, the 3-unsubstituted 1-methyl-2-mercapto imidazole does not show any appreciable difference in weight gains over the controls when administered together with diethyl stilbestrol, the increase in weight is very pronounced when simultaneously using diethyl stilbestrol and 1-methyl-2-mercapto-3-carbethoxy imidazole.

Oral administration of 1-methyl-2-mercapto-3-carbethoxy imidazole and the like substances is preferably carried out by feeding the animal with a feed composition or a feed supplement which contains the required amount of the active compound, and, if combined with estrogens, the required amount of estrogen.

The optimum amount of active agent to be orally administered is regulated according to the weight and the food consumption of the animal. It was found that, when using 1-methyl-2-mercapto-3-carbethoxy imidazole according to the present invention, amounts between about 20 mg. and about 80 mg. per day per 100 lbs. of live weight added to the feed supplement or to the feed ration consumed by the animal, resulted in satisfactory weight gains and improvement of meat quality. Of course, these amounts may vary and depend upon the kind of animal treated and other conditions.

The required amount of active agent is, for instance, admixed to ground corn which serves as carrier therefor. In order to produce such a ground corn feed supplement containing the active agent, the active agent is dissolved in alcohol or other suitable solvents.

The ground corn is intimately mixed with such a solution and the solvent, if volatile, is then evaporated. A ground corn feed supplement prepared in this manner contains, for instance, about 300 mg. of the active compound in 500 g. of the feed supplement. Such a feed supplement can subsequently be mixed with the feed ration in such a proportion that each 500 g. of feed supplement are, for instance, mixed with about 10 kg. of the feed ration.

It is, of course, understood that other methods of incorporating the active agent into the feed or feed supplement may be used.

The use of 1-methyl-2-mercapto-3-carbethoxy imidazole for fattening of growing beef cattle, sheep, and hogs has produced good results. Particularly good results were obtained in fattening steers which are the principal beef producing animals in the United States.

The following examples illustrate the advantageous results achieved with 1-methyl-2-mercapto-3-carbethoxy imidazole in comparison with non-treated controls.

*Example 1*

Hereford heifers were used for fattening. 1-methyl-2-mercapto-3-carbethoxy imidazole was fed to such heifers in doses of 500 mg. per day. The results are given in the following table in comparison with the controls.

In each experiment there were used 10 heifers, 6 heifers representing one brand and four heifers representing another brand. Each of the heifers was identified with an ear tag and was weighed individually on three successive days, namely at the onset of the test, after 20 days, and after 35 days. The weight of the heifers initially ranged from 730 lbs. to 900 lbs. The heifers were considered to be approximately 50 days to 60 days from choice slaughter grade. A ground corn feed supplement served as a carrier for the 1-methyl-2-mercapto-3-carbethoxy imidazole. It was mixed in such a manner that, by feeding 0.5 lb. of said supplement per animal per day, the correct dosage of the active agent was administered. The daily ration for each animal consisted of 3 lbs. of corn silage, 3 lbs. of chopped alfa-alfa hay, later reduced to 2 lbs., 1 lb. of a commercial supplement containing chloro tetracycline, 0.5 lb. of the ground corn feed supplement containing the active agent, and all the cracked corn that the animals would consume, i.e., between about 16 lbs. and about 17.5 lbs.

TABLE 1

|  | Control | 1-Methyl-2-mercapto-3-carbethoxy imidazole, 500 mg./day |
| --- | --- | --- |
| Initial weight | 826.67 | 826.43 |
| Weight after 20 days | 887.13 | 882.67 |
| Final weight | 912.37 | 924.93 |
| Daily gain first 20 days | 3.02 | 2.81 |
| Daily gain last 15 days | 1.68 | 2.82 |
| Daily gain entire 35 day period | 2.45 | 2.81 |
| Total feed per animal: |  |  |
| Corn | 603 | 604 |
| Hay | 90 | 90 |
| Silage | 105 | 105 |
| Supplement | 35 | 35 |
| Average daily ration: |  |  |
| Corn | 17.23 | 17.26 |
| Hay | 2.57 | 2.57 |
| Silage | 3.00 | 3.00 |
| Supplement | 1.00 | 1.00 |
| Feed per cwt. gain first 20 days: |  |  |
| Corn | 576 | 621 |
| Hay | 99 | 107 |
| Silage | 99 | 107 |
| Supplement | 33 | 36 |
| Feed per cwt. gain last 15 days: |  |  |
| Corn | 1,010 | 603 |
| Hay | 119 | 71 |
| Silage | 178 | 106 |
| Supplement | 59 | 35 |
| Feed per cwt. gain entire 35 day period: |  |  |
| Corn | 704 | 613 |
| Hay | 105 | 91 |
| Silage | 123 | 107 |
| Supplement | 41 | 36 |

It is clearly evident that administration of the active agent, at the 500 mg. level, causes a considerable gain in weight and decreases the amount of feed required for the gains. The main increase in gain took place after the first 20 day period. The daily gain on treatment with 1-methyl-2-mercapto-3-carbethoxy imidazole remains constant during the first and second period.

*Example 2*

To prove the surprising synergistic effect of a combined feeding of 1-methyl-2-mercapto-3-carbethoxy imidazole and diethyl stilbestrol, comparative tests were carried out. The following table shows the weight increase in percent observed when administering 1-methyl-2-mercapto-3-carbethoxy imidazole alone, diethyl stilbestrol alone, and a mixture of 1-methyl-2-mercapto-3-carbethoxy imidazole and stilbestol. 0.2% of the active agents were admixed to the feed consumed by the animals. The following table shows the weight gains over the controls.

TABLE 2

|  | 1-Methyl-2-mercapto-3-carbethoxy imidazole, 0.2% | 1-Methyl-2-mercapto imidazole, 0.2% | Stilbestrol, 0.2% | 1-Methyl-2-mercapto-3-carbethoxy imidazole, 0.2%+ Stilbestrol, 0.2% | 1-Methyl-2-mercapto imidazole, 0.2%+ Stilbestrol, 0.2% |
| --- | --- | --- | --- | --- | --- |
|  | Percent | Percent | Percent | Percent | Percent |
| 1st week | −4.1 | −2.0 | +2.0 | +2.0 | +3.1 |
| 2nd week | +7.0 | +7.8 | +9.6 | +8.7 | +8.7 |
| 3rd week | +9.3 | +9.3 | +13.2 | +19.4 | +16.3 |
| 4th week | +15.7 | +12.9 | +13.6 | +20.4 | +15.7 |

These data clearly show that the combination of 1-methyl-2-mercapto-3-carbethoxy imidazole with diethyl stilbestrol produces an additional increase in weight of about 33% over 1-methyl-2-mercapto-3-carbethoxy imidazole administered alone. This is quite unexpected, since a combination of the same amount of a 3-unsubstituted imidazole compound of similar constitution, namely of 1-methyl-2-mercapto imidazole with diethyl stilbestrol does not show such an increase in weight gain over the controls, as is clearly evident from the table given above.

As stated above, the animals do not reject feed supplemented by the addition of 1-methyl-2-mercapto-3-carbethoxy imidazole, while such rejection of the feed is observed with thiourea, thiouracil compounds, and 1-methyl-2-mercapto imidazole, apparently due to their objectionable taste.

1-methyl-2-mercapto-3-carbethoxy imidazole has the advantage over thiouracil compounds and thiourea that it does not affect the blood picture. The toxicity of 1-methyl-2-mercapto-3-carbethoxy imidazole is remarkably low. Dogs, which were fed 1 mg./kg., 3 mg./kg., and 9 mg./kg. of 1-methyl-2-mercapto-3-carbethoxy imidazole did not show any noticeable pathological changes in the investigated organs, such as spleen, heart, gastro-intestinal tract, liver, kidney, pancreas, testes, brain and meninges, gall bladder, adrenals, lungs, ovaries, bladder. The bone marrow was found to contain large amounts of fat and a very good hematopoietic activity. The testes showed good spermatogenesis. It is evident that even with the above mentioned high doses given to dogs over a three months period, no noticeable toxic effects are caused by 1-methyl-2-mercapto-3-carbethoxy imidazole.

Administration of 1-methyl-2-mercapto-3-carbethoxy imidazole to live-stock and especially to steers has many advantages over administration of thiouracil compounds, thiourea, and 1-methyl-2-mercapto imidazole, a compound differing from the compound according to the present invention by the absence of the carbethoxy group in 3-position. Such advantages, for instance, are (1) The compound is highly palatable and feed containing it is not rejected by the animal.

(2) The compound has a remarkable weight increasing effect, both by itself and in combination with estrogens.

(3) The compound causes better feed utilization and, thus, considerable savings.

(4) The compound does not produce pathological changes in the edible organs of the animal.

(5) There is no residue formation of the compound in the edible parts of the treated animal at the time of slaughter. In any event, such residues as may be found are considerably less toxic than residues from any other known goitrogen, even from 1-methyl-2-mercapto imidazole.

It is, of course, also possible to combine 1-methyl-2-mercapto-3-carbethoxy imidazole and the like compounds with other feed additives, such as salt, salt mixtures containing calcium, phosphorus, trace elements, with vitamins, such as vitamin D and vitamin $B_{12}$, with amino acids, such as lysine, with antibiotics and other chemicals and drugs ordinarily admixed to and supplementing feed for livestock and poultry.

As stated above, the treatment with 1-methyl-2-mercapto-3-carbethoxy imidazole and imidazole compounds having a carboxy substituent in 3-position as indicated by Formula I, such as 1-methyl-2-mercapto-3-carbomethoxy imidazole, 1-methyl-2-mercapto-3-carbobenzoxy imidazole, 1-methyl-2-mercapto-3-hippuroyl imidazole and others, has not only a favorable effect on the rate of weight gains but also on the meat quality. In contrast to the treatment with other agents, the meat quality is considerably improved or, at least, remains as good as that of untreated animals.

Oral administration of the active agent is carried out daily, preferably in subdivided doses with each feeding, over the entire growth or fattening period of the animal. Feeding of the active agent is usually discontinued one or two days before slaughtering.

Due to its low toxicity the active agent need not be administered in such carefully regulated doses as this is necessary, for instance, with estrogens. An excess of the active agent does not cause serious undesirable side-effects. It is, of course, advisable for economic reasons to determine the required minimum amount and to regulate it in such a manner that the desired increase in the rate of weight gain is achieved.

In place of ground corn to be used as carrier for the active agent, there may, of course, be used other cattle and sheep feed supplements, such as oilseed residues, for instance, soybean meal, cottonseed meal, linseed meal, or branny material, such as wheat bran, or alfalfa meal, and the like protein supplements. It is understood that a thorough and uniform distribution of the active agent throughout the feed supplement or the feed is of great importance in order to assure administration of the required dose.

Of course, many changes and variations in the composition of the feed supplements and feed having incorporated therein the active agent, in the manner of administering the active agent to the animals to be treated, and the like may be made by those skilled in the art in accordance with the principles set forth herein and in the claims annexed thereto.

I claim:

1. A composition for improving feed utilization and growth rate of live-stock and poultry, comprising a normal feed ration having incorporated therein 1-methyl-2-mercapto-3-carbethoxy imidazole and an estrogen, said feed ration supplying to the animal daily amounts between about 20 mg. and about 80 mg. of said imidazole compound and, of the estrogen, daily amounts corresponding to an estrogenic activity between about 0.01 mg. and about 5.0 mg. of diethyl stilbestrol per 100 lbs. of live weight.

2. The method of improving feed utilization and growth rate of live-stock and poultry comprising feeding to such animals 1-methyl-2-mercapto-3-carbethoxy imidazole at a daily rate between about 20 mg. and about 80 mg. and an estrogen at a daily rate corresponding to an estrogenic activity between about 0.01 mg. and about 5.0 mg. of diethyl stilbestrol per 100 lbs. of live weight.

3. The method of improving growth rate and fattening of steers comprising orally administering to said steers 1-methyl-2-mercapto-3-carbethoxy imidazole at a daily rate between about 20 mg. and about 80 mg. and an estrogen at a daily rate corresponding to an estrogenic activity between about 0.01 mg. and about 5.0 mg. of diethyl stilbestrol per 100 lbs. of live weight.

References Cited in the file of this patent

UNITED STATES PATENTS

| | | |
|---|---|---|
| 2,438,353 | Turner | Mar. 23, 1948 |
| 2,504,401 | Ernsting | Apr. 18, 1950 |
| 2,815,349 | Rimington | Dec. 3, 1957 |
| 2,881,112 | Mattox | Apr. 7, 1959 |